(12) United States Patent
Stoesz

(10) Patent No.: US 9,488,794 B2
(45) Date of Patent: Nov. 8, 2016

(54) FIBER OPTIC STRAIN LOCKING ARRANGEMENT AND METHOD OF STRAIN LOCKING A CABLE ASSEMBLY TO TUBING

(71) Applicant: Carl W. Stoesz, Blacksburg, VA (US)

(72) Inventor: Carl W. Stoesz, Blacksburg, VA (US)

(73) Assignee: BAKER HUGHES INCORPORATED, Houston, TX (US)

( * ) Notice: Subject to any disclaimer, the term of this patent is extended or adjusted under 35 U.S.C. 154(b) by 511 days.

(21) Appl. No.: 13/690,062

(22) Filed: Nov. 30, 2012

(65) Prior Publication Data

US 2014/0153884 A1 Jun. 5, 2014

(51) Int. Cl.
*G02B 6/44* (2006.01)
*G01L 1/24* (2006.01)
*G02B 6/12* (2006.01)

(52) U.S. Cl.
CPC ............ *G02B 6/443* (2013.01); *G01L 1/242* (2013.01); *G02B 2006/12138* (2013.01); *Y10T 29/49826* (2015.01)

(58) Field of Classification Search
CPC ....................................................... G02B 6/443
See application file for complete search history.

(56) References Cited

U.S. PATENT DOCUMENTS

| | | | |
|---|---|---|---|
| 3,717,719 A | 2/1973 | Smith et al. | |
| 4,265,690 A | 5/1981 | Lowenhar | |
| 4,755,037 A | 7/1988 | Bjornlie et al. | |
| 4,836,872 A | 6/1989 | Landry et al. | |
| 5,274,725 A * | 12/1993 | Bottoms et al. | 385/105 |
| 5,344,511 A | 9/1994 | Graefe et al. | |
| 5,509,097 A | 4/1996 | Tondi-Resta et al. | |
| 5,514,080 A | 5/1996 | Blott et al. | |
| 5,848,212 A | 12/1998 | Wagman | |
| 6,004,639 A * | 12/1999 | Quigley et al. | 428/36.3 |
| 6,191,414 B1 * | 2/2001 | Ogle et al. | 250/227.14 |
| 6,324,323 B1 | 11/2001 | Benham | |
| 6,431,767 B2 | 8/2002 | Nagasaki | |
| 6,457,533 B1 | 10/2002 | Metcalfe | |
| 6,874,361 B1 | 4/2005 | Meltz et al. | |
| 7,013,979 B2 | 3/2006 | Richard | |
| 7,252,437 B2 | 8/2007 | Ringgenberg | |
| 7,318,481 B2 | 1/2008 | Richard | |
| 7,644,773 B2 | 1/2010 | Richard | |
| 7,708,073 B2 | 5/2010 | Richard | |

(Continued)

FOREIGN PATENT DOCUMENTS

| | | | |
|---|---|---|---|
| GB | 2020085 A | 11/1979 | |
| JP | 6148440 A | 5/1994 | |

(Continued)

OTHER PUBLICATIONS

Dana DuToit et al., "Distributed Fiber Optic Strain and Temperature Sensor for Subsea Umbilical"; International Offshore and Polar Engineering Conference; Jun. 17, 2012; 7 pages.

(Continued)

*Primary Examiner* — Daniel Petkovsek

(57) ABSTRACT

A fiber optic strain locking arrangement includes a cable assembly having an outer radial surface, an optical fiber strain transmissively coupled to the outer radial surface, and tubing disposed at the outer radial surface. The tubing is strain locked to the outer radial surface through at least one of interference fit with granules at least partially embedded into at least one of the tubing and the outer radial surface and adhesive bonding to both the tubing and the outer radial surface.

9 Claims, 3 Drawing Sheets

(56) References Cited

U.S. PATENT DOCUMENTS

| | | |
|---|---|---|
| 7,792,405 B2 | 9/2010 | Stoesz et al. |
| 7,903,695 B2 | 3/2011 | Kojima et al. |
| 7,954,560 B2 | 6/2011 | Mathiszik et al. |
| 7,983,520 B2 | 7/2011 | Bringuier et al. |
| 8,111,952 B2 * | 2/2012 | Herbst .................... G01L 1/242 385/12 |
| 8,191,225 B2 | 6/2012 | Richard |
| 8,292,803 B2 | 10/2012 | Watanabe |
| 8,326,103 B2 | 12/2012 | Stoesz et al. |
| 8,443,888 B2 | 5/2013 | Coronado |
| 8,684,075 B2 | 4/2014 | Guest et al. |
| 8,973,434 B2 | 3/2015 | Albrecht et al. |
| 9,335,502 B1 * | 5/2016 | Wysocki .............. G02B 6/4427 |
| 2002/0006254 A1 | 1/2002 | Nagasaki |
| 2002/0076189 A1 | 6/2002 | McMullin et al. |
| 2002/0087156 A1 | 7/2002 | Maguire et al. |
| 2002/0088931 A1 | 7/2002 | Danisch et al. |
| 2002/0129935 A1 | 9/2002 | Castano-Mears et al. |
| 2002/0131727 A1 | 9/2002 | Reedy et al. |
| 2002/0178582 A1 | 12/2002 | Echols et al. |
| 2003/0138234 A1 | 7/2003 | Yong |
| 2004/0035590 A1 | 2/2004 | Richard |
| 2004/0060695 A1 | 4/2004 | Castano-Mears et al. |
| 2004/0062497 A1 | 4/2004 | Plemmons et al. |
| 2004/0071416 A1 | 4/2004 | Militaru |
| 2004/0252954 A1 * | 12/2004 | Ginocchio et al. ........... 385/100 |
| 2005/0173130 A1 | 8/2005 | Richard |
| 2005/0205263 A1 | 9/2005 | Richard |
| 2005/0276551 A1 | 12/2005 | Brown et al. |
| 2006/0015014 A1 | 1/2006 | Remijan et al. |
| 2006/0182398 A1 | 8/2006 | Dowd et al. |
| 2008/0271926 A1 | 11/2008 | Coronado et al. |
| 2008/0310803 A1 | 12/2008 | Franke et al. |
| 2009/0034903 A1 | 2/2009 | Herbst |
| 2009/0223678 A1 | 9/2009 | Richard et al. |
| 2009/0252463 A1 | 10/2009 | Stoesz et al. |
| 2009/0252464 A1 | 10/2009 | Stoesz et al. |
| 2009/0254280 A1 | 10/2009 | Stoesz |
| 2011/0058778 A1 * | 3/2011 | Herbst .......................... 385/100 |
| 2011/0112410 A1 | 5/2011 | Hirota |
| 2011/0229099 A1 | 9/2011 | Hartog et al. |
| 2013/0051739 A1 | 2/2013 | Stoesz et al. |
| 2013/0094798 A1 | 4/2013 | Duncan et al. |
| 2013/0094812 A1 | 4/2013 | Stoesz |
| 2014/0056553 A1 | 2/2014 | Williger |
| 2014/0153884 A1 | 6/2014 | Stoesz |
| 2015/0125117 A1 | 5/2015 | Stoesz et al. |

FOREIGN PATENT DOCUMENTS

| | | |
|---|---|---|
| WO | 2012122336 A1 | 9/2012 |
| WO | 2012178143 A1 | 12/2012 |

OTHER PUBLICATIONS

J.R. Gage et al., "Fiber optic strain and temperature monitoring in crystalline rock at the Sanford Underground Science and Engineering Laboratory (SUSEL), Lead, South Dakota"; American Rock Mechanics Association; ARMA 10-367; Jun. 27, 2010; 8 pages.

D.S. McKeehan et al., "Marine Applications for a Continuous Fiber-Optic Strain-Monitoring System, Part II"; Offshore Technology Conference; OTC 5564; Apr. 27, 1987; 10 pages.

Notification of Transmittal of the International Search Report and the Written Opinion; PCT/US2013/067249; Korean Intellectual Property Office; Dated Feb. 18, 2014; ISR 3 pages; WO 5 pages.

International Search Report and Written Opinion; Date of Mailing Jan. 15, 2015, International Application No. PCT/US2014/059000, Korean Intellectual Property Office, 11 pages.

Notification of Transmittal of the International Search Report and the Written Opinion of the International Searching Authority; PCT/US2014/059004; Korean Intellectual Property Office; Mailed Jan. 9, 2015; 9 pages.

Xihao et al., "Strain Transfer Capability of Strain Sensing Optical Fiber Cableand Its Measurement Method", International Wire & Cable Symposium, Proceedings of the 57th IWCS, Nov. 9-12, 2008, Rhode Island Convention Center, Providence, RI.

Yokosuka et al., "A Low Loss Multifiber Connecter and its Applications", Electronic Components and Technology conference, May 20-23, 1990, Las Vegas, NV, pp. 865-868, vol. 1.

* cited by examiner

FIBER OPTIC STRAIN LOCKING ARRANGEMENT AND METHOD OF STRAIN LOCKING A CABLE ASSEMBLY TO TUBING

BACKGROUND

Optical fibers can be used to monitor strain in a tool. To do so the optical fiber is attached to a length of the tool for which the strain is to be measured. Accuracy and reliability require that the optical fiber be attached to the tool over the span for which measurements will be taken. Because of their fragility, however, optical fibers are typically housed within one or more protective sheaths. Systems and methods for attaching the sheaths together such that strain is reliably transmitted therebetween are always of interest to those practicing in the art.

BRIEF DESCRIPTION

Disclosed herein is a fiber optic strain locking arrangement. The arrangement includes a cable assembly having an outer radial surface, an optical fiber strain transmissively coupled to the outer radial surface, and tubing disposed at the outer radial surface. The tubing is strain locked to the outer radial surface through at least one of interference fit with granules at least partially embedded into at least one of the tubing and the outer radial surface and adhesive bonding to both the tubing and the outer radial surface.

Further disclosed herein is a method of strain locking a fiber optic cable assembly to tubing. The method includes strain transmissively mounting an optical fiber to an outer radial surface of a cable assembly, positioning granules or applying adhesive at the outer radial surface of the cable assembly or a face of a flat strip of tubing, rolling the flat strip of tubing around the cable assembly, seam welding the rolled flat strip of tubing, embedding the granules into at least one of the outer radial surface and the face of the tubing or adhesively attaching the outer radial surface and the face, and establishing strain transmissivity between the tubing and the cable assembly.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
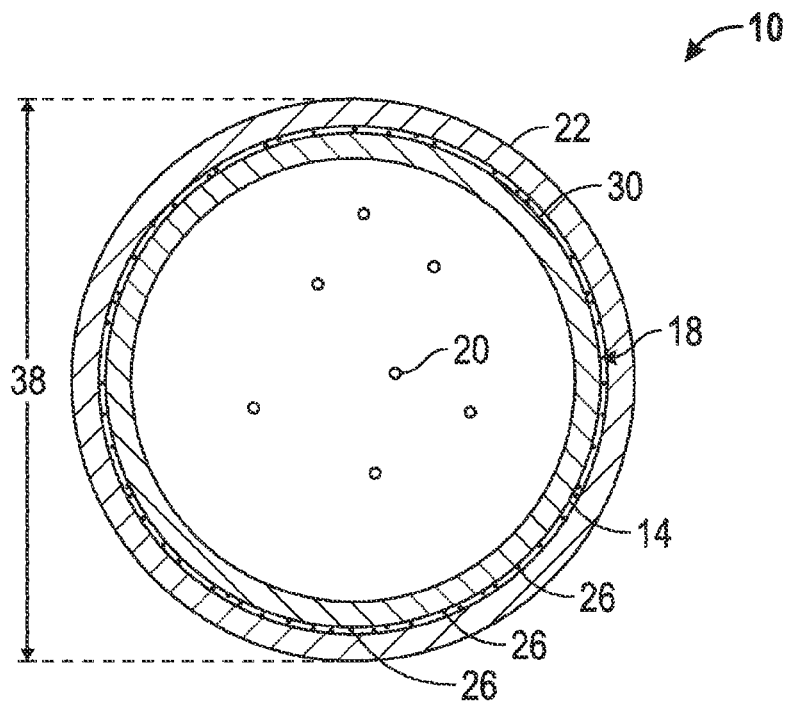
FIG. 1 depicts a cross sectional end view of a fiber optic strain locking arrangement disclosed herein.
Figure 2:
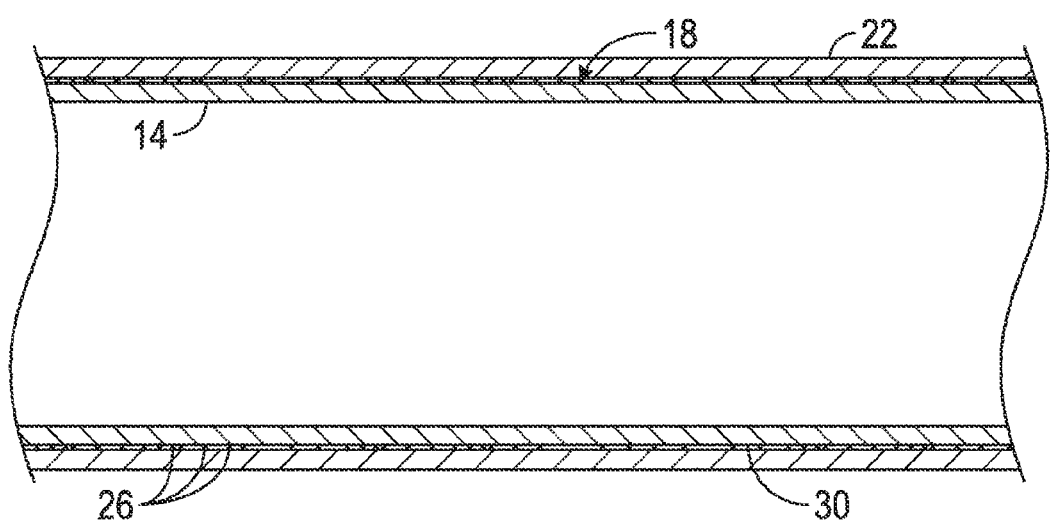
FIG. 2 depicts a cross sectional side view of the fiber optic strain locking arrangement of FIG. 1.

Referring to FIGS. 1 and 2, an embodiment of a fiber optic strain locking arrangement is illustrated at 10. The fiber optic strain locking arrangement 10 includes a cable assembly 14 having an outer radial surface 18, an optical fiber 20 strain transmissively coupled to the outer radial surface 18, and tubing 22 disposed around the cable assembly 14 and strain locked to the outer radial surface 18. The strain locking between the cable assembly 14 and the tubing 22 effectively assuring strain encountered by either the cable assembly 14 or the tubing 22 being transmissively communicated to the other of the cable assembly 14 and the tubing 22. The strain locking being accomplished through either individually or a combination of interference fit and adhesion (via an adhesive 30), between the cable assembly 14 and the tubing 22. The interference fit including granules 26 that are at least partially embedded into at least one of the cable assembly 14 and the tubing 22. It should be noted that the strain trasmissivity disclosed also applies to transient values of strain, or strain that varies over time, as is the case with acoustics and vibration, for example. In addition strain transmissivity can include thermal strains.

In the embodiment illustrated the tubing 22 is a single wall metal tubular member that provides structural support to the cable assembly 14 in general and the optical fiber 20 in particular. Other embodiments of the tubing 22 could have shapes other than the cylindrical shape shown herein and have more than one layer constituting the wall, as well as be fabricated from materials other than metal.

Figure 3:
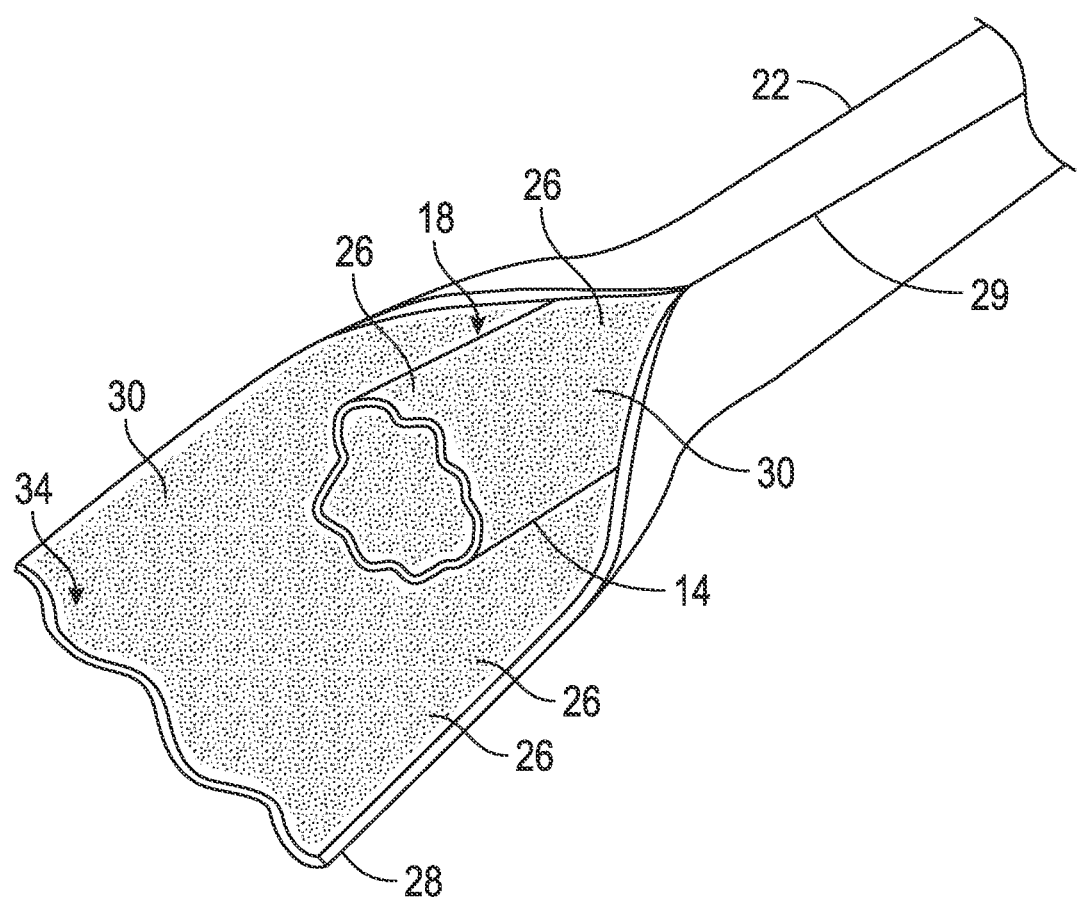
FIG. 3 depicts a perspective view of flat sheet of tubing being rolled around a cable assembly of a fiber optic strain locking arrangement disclosed herein.

Referring to FIG. 3, the metal walled tubing 22 illustrated herein is formed by rolling a flat sheet 28 and welding it at a seam 29 around the cable assembly 14. Depending upon the specifics of a particular embodiment, the granules 26 and/or the adhesive 30 can be positioned on one or both of the outer radial surface 18 and a face 34 of the tubing 22 that comes into contact with the outer radial surface 18 upon being welded.

The adhesive 30, if employed, can bond to both the outer radial surface 18 and the face 34 to adhesively strain transmissively lock them together. Alternately, or in addition to adhesive 30, the granules 26 can be positioned on either or both of the outer radial surface 18 and the face 34 to mechanically strain transmissively lock them together. The granules 26 can be made of a hard material such as carbide, or ceramic, for example. By making the granules 26 of a material that is harder than the outer radial surface 18 and the face 34 they can become partially embedded in one or both of the outer radial surface 18 and the face 34. An additional processing step of drawing down a radial dimension 38 of the tubing 22, and maintaining the tubing 22 at or near the radial dimension 38, can increase interference between the tubing 22 and the cable assembly 14 thereby embedding the granules 26 into the outer radial surface 18 and the face 34 and improving strain transmissivity therebetween.

The cable assembly 14 can also be referred to by other names employed in the industry, such as simply core, or mandrel or FIMT, which stands for Fiber In Metal Tube, for some specific configurations. In embodiments, such as the one illustrated in FIGS. 1 and 2 that employ a FIMT cable assembly, the optical fiber 20 is encased in a metal tubular and is strain transmissively coupled thereto. The fiber optic strain locking arrangement 10 can be employed in the construction of tubular systems that are referred to by various names including, a tubular encapsulated cable assembly, a capillary tubular or a control line, for example.

Figure 4:
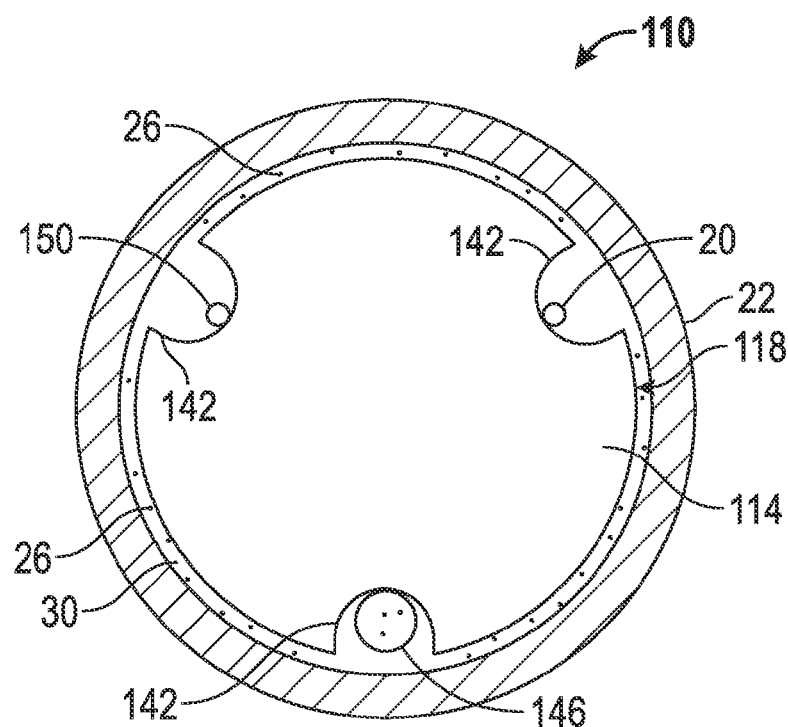
FIG. 4 depicts a cross sectional end view of an alternate embodiment of a fiber optic strain locking arrangement disclosed herein.

Referring to FIG. 4 an alternate embodiment of a fiber optic strain locking arrangement is illustrated at 110. The arrangement 110 differs from the arrangement 10 in the configuration of a cable assembly 114. The cable assembly 114 is a solid member with one or more grooves 142 formed longitudinally in an outer radial surface 118, with three of the grooves 142 being shown in this Figure. The optical fiber 20 is positioned within one of the grooves 142 and is transmissively engaged with the cable assembly 114. Additional optical fibers 146 or other lines 150 may be positioned within any of the grooves 142, and may or may not be strain transmissively coupled to the cable assembly 114. The outer radial surface 118 of the cable assembly 114 is, however, strain locked to the tubing 22, via the granules 26 or the adhesive 30, as described in detail with reference to FIGS. 1 and 2 above. The grooves 142 in the outer radial surface 118 break up the outer radial surface 118 so that it is perimetrically discontinuous. The strain locking of the cable assembly 114 with the tubing 22, is however, maintained regardless of this discontinuity.

Figure 5:
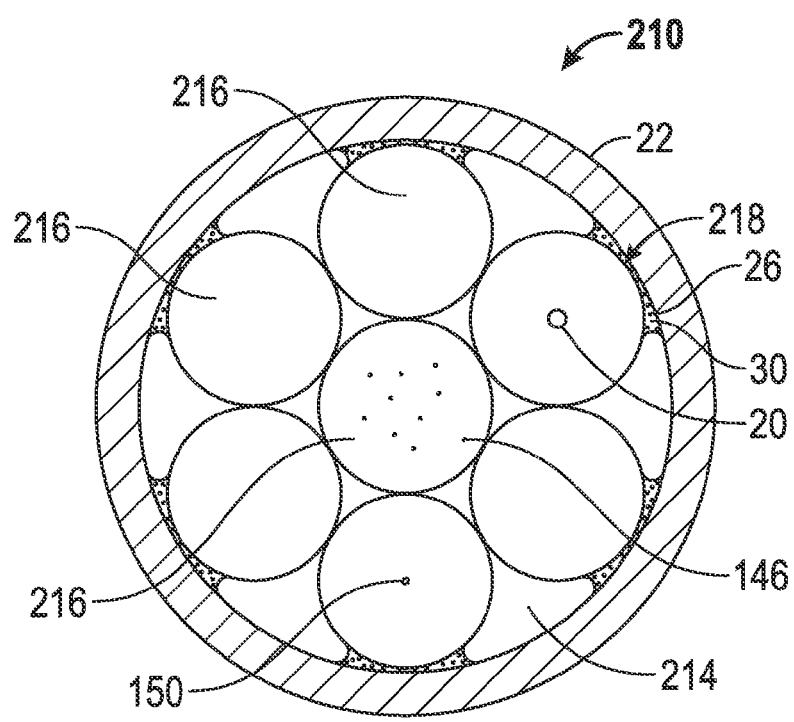
FIG. 5 depicts a cross sectional end view of another alternate embodiment of a fiber optic strain locking arrangement disclosed herein.

Referring to FIG. 5 another alternate embodiment of a fiber optic strain locking arrangement is illustrated at 210. The arrangement 210 differs from the arrangements 10 and 110 in that the cable assembly 214 includes a plurality of elongated members 216. The plurality of elongated members 216 together defines an outer radial surface 218. At least one of the elongated members 216 has the optical fiber 20 strain transmissively coupled thereto, via the granules 26 or the adhesive 30. As such, the strain locking between the tubing 22 and the outer radial surface 218 results in the strain transmissivity between the optical fiber 20 and the tubing 22. As with other embodiments discussed herein, the additional optical fibers 146 and lines 150 can be employed in some of the elongated members 216 without necessarily being strain locked to the tubing 22.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A fiber optic strain locking arrangement comprising:
    a cable assembly having an outer radial surface;
    an optical fiber being strain transmissively coupled to the outer radial surface;
    a tubing disposed at the outer radial surface and being strain locked to the outer radial surface through an interference fit; and
    a plurality of particles arranged between and at least partially embedded into, at least one of the tubing and the outer radial surface of the cable assembly, the plurality of particles facilitating, at least in part, the interference fit and having a hardness that is greater than a hardness of the cable assembly and the tubing.

2. The fiber optic strain locking arrangement of claim 1, wherein the cable assembly houses the optical fiber.

3. The fiber optic strain locking arrangement of claim 1, wherein the outer radial surface is defined by a metal tubular encasing the optical fiber.

4. The fiber optic strain locking arrangement of claim 1, wherein the tubing provides structural support to the cable assembly.

5. The fiber optic strain locking arrangement of claim 1, wherein the tubing is metal.

6. The fiber optic strain locking arrangement of claim 1, wherein the tubing is drawn down to radially interfere with the cable assembly.

7. The fiber optic strain locking arrangement of claim 1, wherein the granules are a harder material than at least one of the outer radial surface and the tubing.

8. The fiber optic strain locking arrangement of claim 1, wherein the outer radial surface is perimetrically discontinuous.

9. The fiber optic strain locking arrangement of claim 1, wherein the granules are embedded in both the cable assembly and the tubing.

* * * * *